(12) United States Patent
Rattunde

(10) Patent No.: US 8,127,644 B2
(45) Date of Patent: Mar. 6, 2012

(54) ROTARY TRANSMISSION LEADTHROUGH FOR A PIPE CUTTING MACHINE

(76) Inventor: Ulrich Rattunde, Bentwisch (DE)

( * ) Notice: Subject to any disclaimer, the term of this patent is extended or adjusted under 35 U.S.C. 154(b) by 220 days.

(21) Appl. No.: 12/311,194

(22) PCT Filed: Sep. 10, 2007

(86) PCT No.: PCT/DE2007/001588
§ 371 (c)(1),
(2), (4) Date: Jan. 25, 2010

(87) PCT Pub. No.: WO2008/034407
PCT Pub. Date: Mar. 27, 2008

(65) Prior Publication Data
US 2010/0116105 A1    May 13, 2010

(30) Foreign Application Priority Data
Sep. 21, 2006   (DE) .................. 10 2006 045 095

(51) Int. Cl.
 *B23B 1/00* (2006.01)
 *B23D 21/04* (2006.01)
(52) U.S. Cl. .......................... 82/1.11; 82/124
(58) Field of Classification Search .............. 82/1.11, 82/1.2, 1.4, 117, 118, 120, 124, 126, 127, 82/129, 165
See application file for complete search history.

(56) References Cited

U.S. PATENT DOCUMENTS

| | | | | |
|---|---|---|---|---|
| 2,161,545 A | * | 6/1939 | Groene et al. | 82/117 |
| 2,384,809 A | * | 9/1945 | Bullard et al. | 29/36 |
| 2,856,178 A | * | 10/1958 | Way, Jr. | 266/56 |
| 3,116,537 A | * | 1/1964 | Boner | 29/44 |
| 3,895,424 A | * | 7/1975 | Hautau | 29/38 C |
| 4,869,127 A | * | 9/1989 | Ariyoshi | 475/1 |
| 5,167,175 A | * | 12/1992 | Rohm | 82/142 |
| 6,302,003 B1 | * | 10/2001 | Haller et al. | 82/1.11 |
| 7,343,839 B2 | * | 3/2008 | Lu | 82/126 |

FOREIGN PATENT DOCUMENTS

| | | |
|---|---|---|
| DE | 1463226 | 2/1964 |
| DE | 3617103 | 5/1986 |
| DE | 19856738 | 9/1998 |

* cited by examiner

*Primary Examiner* — Will Fridie, Jr.
(74) *Attorney, Agent, or Firm* — Varnum, Riddering, Schmidt & Howlett LLP

(57) ABSTRACT

Rotary transmission leadthrough with: a shaft (3) able to turn about a longitudinal axis running in the longitudinal direction (L) with at least one longitudinal borehole (26, 27, 28) running in the longitudinal direction (L), in which a push rod (43, 44, 45) is arranged and can move back and forth relative to the shaft (3) in the longitudinal direction (L), and with at least one opening (22, 23) in a lateral wall of the shaft which extends to a coordinated longitudinal borehole (26, 27, 28) and at least one push fork (12, 13, 14) which can travel in the longitudinal direction (L) outside the shaft (3) and is coordinated with one of the push rods (43, 44, 45), and an active connection running through the coordinated opening (22, 23) to the coordinated longitudinal borehole (26, 27, 28) between the coordinated push fork (12, 13, 14) and the coordinated push rod (43, 44, 45), which transmits a back and forth motion of the coordinated push fork (12, 13, 14) relative to the shaft (3) onto the coordinated push rod (43, 44, 45), and enables a rotary motion of the shaft (3) relative to the coordinated push fork (12, 13, 14).

20 Claims, 7 Drawing Sheets

ROTARY TRANSMISSION LEADTHROUGH FOR A PIPE CUTTING MACHINE

RELATED APPLICATIONS

This is a National Phase application based on International Application Serial No. PCT/DE2007/001588 filed Sep. 10, 2007, which claims benefit of priority of German patent application 10 2006 045 095.7 filed Sep. 21, 2006.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

1. Field of the Invention

The invention concerns a rotary transmission leadthrough, a machine for machining the ends of a rodlike profile material and a method with a rotary transmission leadthrough and a method for machining the ends of a rodlike profile material.

2. Background Art

Rotary transmission leadthroughs are familiar in the prior art. Traditionally, a push rod arranged centrally in a rotating shaft is driven back and forth in the longitudinal direction of the shaft at one of its end faces. The translatory movement of the drive is transmitted by the push rod, for example, to a tool at the other end of the push rod and thus controls it. It is also known how to arrange several telescopically nested push rods concentrically in a rotatable shaft and to control several tools. The drawback to the known rotary transmission leadthroughs, however, is the fact that several translatory drive mechanisms for the push rods need to be arranged at the end face of the rotatable shaft. The drive for the shaft itself is then provided at the same end face. This causes space problems.

At the other end of the telescopically nested push rods, the translatory movements need to be demultiplexed and supplied to the individual tools. This requires an additional mechanism.

In DE 36 17 103 C1, a spindle for a machine tool provided with a tool chuck device is described. The spindle, able to rotate and mounted in a machine tool, has clamping means for clamping and releasing a tool. An energy accumulator is charged when the tool is not clamped and at least partly discharged to tighten the clamping means when the tool is clamped.

A machine tool for the machining of workpieces is known from DE 198 56 738 C1. Here, a tool support can travel by means of a mechanism in rolling thread contact having a rolling spindle and a spindle nut. However, the independent control of several tools is not possible here.

An automatic pipe cutting machine is known from DE 14 632 26. A mechanism is provided for the machining of the pipes that guides and rotates the pipe being machined, as well as a cutting tool that is guided along the center line of the pipe. And a control circuit, which coordinates the cutting tool and the guiding and rotating mechanism.

BRIEF SUMMARY OF THE INVENTION

The task of the present invention is to provide an improved rotary transmission leadthrough, a method with a rotary transmission leadthrough, a cutting machine having such a rotary transmission leadthrough, and a method for the machining of ends of a rodlike profile material.

The task is fulfilled in its first aspect by a rotary transmission leadthrough with the features of claim 1. The rotary transmission leadthrough of the invention has a shaft able to turn about a longitudinal axis running in the longitudinal direction with at least one longitudinal borehole running in the longitudinal direction, in which a push rod is arranged and can move back and forth relative to the shaft. At least one opening is provided in a lateral wall of the shaft, being coordinated with a respective longitudinal borehole and connecting the longitudinal borehole to the exterior of the shaft. The edges of the at least one lateral opening are preferably at a distance from the end faces of the shaft, and they run entirely in the lateral shaft wall. Outside the shaft there is provided at least one push fork which can travel in the longitudinal direction and is coordinated with one of the push rods. An active connection is provided between the coordinated push fork and the coordinated push rod. The active connection is configured such that, first, it transmits a back and forth motion of the coordinated push fork relative to the shaft onto the coordinated push rod, and secondly, it enables a rotary motion of the shaft relative to the coordinated push fork.

The active connection preferably has an arm reaching through the coordinated opening, which is joined to the respective push rod free of translation, the opening being longer in the longitudinal direction than the dimension of the part of the arm in the opening, so that the arm in the opening can move back and forth in the longitudinal direction. This configuration allows the back and forth motion to be led through from the outside into the longitudinal borehole.

For an exact transmission of motion, the arm is connected to the coordinated push fork preferably free of translation.

In one especially stable embodiment of the invention, at least one annular structural part surrounds the shaft in the segment of an opening, from which the arm sticks out into the opening.

The arm is preferably formed on the annular structural part and fixed in position. The annular structural part can be arranged on the shaft, able to shift back and forth, thereby transmitting the back and forth motion. The movable connection can preferably be formed by a ball bearing.

Advantageously, the push fork has an annular segment that concentrically encloses the shaft, being connected via an outer bearing to an annular structural part, able to rotate relative to the annular segment and being arranged concentrically inside the annular segment. Preferably the outer bearing is an angular-contact ball bearing.

On each annular segment there can be provided a lug, each of which engages with a drive mechanism and moves the push fork back and forth. The drive mechanism can have a threaded rod coming out from the drive and connected to the lug free of translation.

To prevent tilting of the push fork, each of the push forks is guided on a guide rod running in the lengthwise direction along the shaft.

In an especially preferred embodiment of the invention, a plurality of lengthwise bores arranged alongside each other in the shaft and a plurality of openings coordinated one by one with the lengthwise bores are provided, being arranged one behind the other in the lengthwise direction, staggered by at least their respective lengthwise dimension. In this way, several translatory movements can be led into the shaft.

Preferably, the several lengthwise bores are arranged eccentrically to the axis of rotation of the shaft. In particular, the eccentric arrangement of the several lengthwise bores enables an arrangement of the plurality of lengthwise bores with rotational symmetry about the axis of rotation, being inserted in the shaft parallel to each other in the lengthwise direction of the shaft.

Accordingly, the specially preferred embodiment of the invention has a plurality of push forks staggered in the lengthwise direction and arranged one behind the other on the shaft, each in the segment of an opening.

Advantageously, translation drives for each of the push rods can thus be arranged at first next to the shaft and in particular the translatory motion can be transmitted laterally through the shaft wall, that is, through the lateral cylindrical wall of the shaft, onto push rods arranged alongside each other in the shaft. Thus, on the whole, substantially more room is provided for the arrangement of the drives of the push rods in a machine laterally on the shaft than in the case of telescopically nested push rods.

The problem is solved in its second aspect by a machine as mentioned in the beginning for the machining of ends of a rodlike profile material with a holding device for the profile material and with an above-described rotary transmission leadthrough and with at least one blade in active connection with a push rod being provided at one end of the shaft facing the holding device for machining the end of the rodlike profile material. The machine is preferably a pipe-end cutting machine.

The machine is preferably part of a sawing center for metallic profile material, especially metal pipes. A sawing center is characterized in that several machining steps which can be carried out in succession can be carried out integrally during the machining of pipes in a machine. After cutting off a pipe segment from a pipe, the end of the pipe is often adapted to customer requirements and therefore subjected to further processing steps, such as cutting bevels. It is often necessary to provide the pipe ends not with a rotationally symmetrical bevel, but instead to provide bevels along the periphery of the pipe end with a profile which is undulating about the pipe end. Such bevels can be fabricated if the cutting tools can travel radially in the cross section of the pipe during the rotation of the shaft. The shaft rotates during the bevel cutting process, and the cutting tools are arranged around its lengthwise axis at its end facing the profile material. The profile material is arranged with its end opposite to the cutting tools as an extension of the lengthwise axis. Due to the rotation of the cutting tools, a bevel is produced at the end of the pipe. The bevel can be given a circumferential wavy structure by periodic radial displacement of the cutting.

Another benefit is that the pipe end, due to the radially movable cutting, can be provided with relieving, recesses and contours during the turning.

In order to convert the translatory back and forth motion of the push rod into a radial motion of the cutting tools, deflection mechanisms are provided between push rod and cutting tool. Preferably, one end of the push rod facing the holding device is beveled and a blade able to move back and forth across the push rod is pretensioned. The blade has a correspondingly beveled end and the two beveled ends are in active connection with each other. However, other deflection mechanisms are also conceivable, such as a gear that engages with respective tooth series of the push rod and the cutting tool, as well as an eccentrically mounted two-arm lever or a toggle link.

With regard to the first method, the problem is solved with a rotary transmission leadthrough in that a shaft with at least one lengthwise bore running in the lengthwise direction is turned about a lengthwise axis running in the lengthwise direction, a back and forth motion of at least one push fork, coordinated with one of the push rods and able to travel in the lengthwise direction outside of the shaft, is led through at least one side opening in a shaft wall, coordinated with a lengthwise bore, and a push rod arranged in the lengthwise bore is pushed back and forth.

In its fourth aspect, the problem is solved by a method for machining of ends of a rodlike profile material with an aforementioned machine, in that the profile material is fixed in the holding device, a desired bevel profile is entered into the control system, and the motor and the drives are actuated to generate the desired bevel profile at the pipe end.

The invention will be described by means of sample embodiments in nine figures. These show:

DETAILED DESCRIPTION OF THE INVENTION

Figure 1:
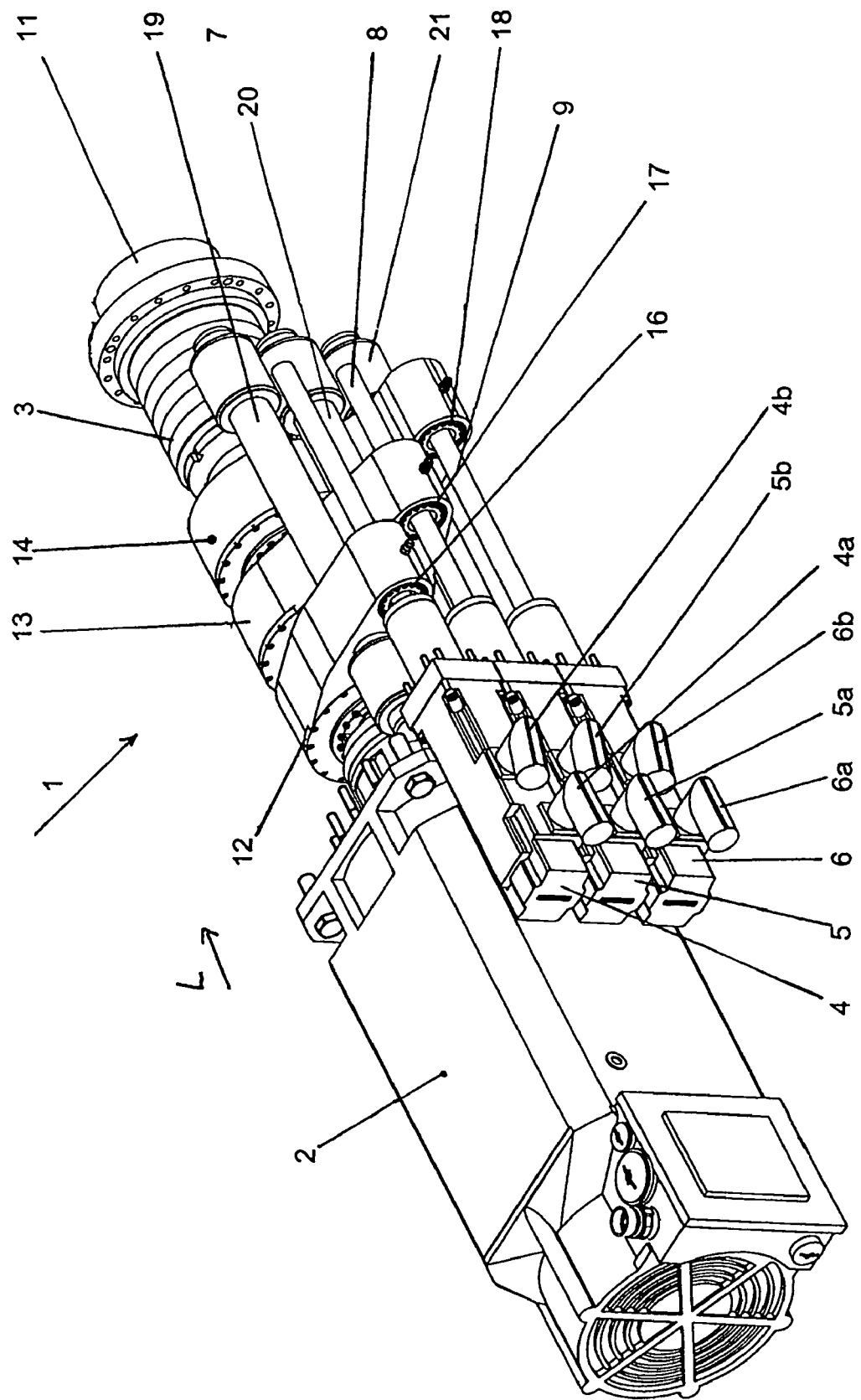
FIG. 1, a perspective view of a rotary transmission leadthrough according to the invention for three cutting tools, FIG. 2, a perspective view of the rotary transmission leadthrough of FIG. 1 for one cutting tool, FIG. 3, a mechanical rotary transmission leadthrough per FIG. 1, FIG. 4, a shaft of the rotary transmission leadthrough in FIG. 1-3, FIG. 5, a cross sectional view of a push fork of FIG. 1-3, FIG. 6, a first embodiment of a deflection mechanism between push rod and cutting tool, FIG. 7, a second embodiment of a deflection mechanism, FIG. 8, a third embodiment of a deflection mechanism, FIG. 9, a fourth embodiment of a deflection mechanism.

FIG. 1 shows the rotary transmission leadthrough 1 of the invention with a motor 2 driving a rotatable shaft 3 and with three drives 4, 5, 6 for three threaded rods 7, 8, 9, each drive 4, 5, 6 driving precisely one of the threaded rods 7, 8, 9. The rotary transmission leadthrough 1 is part of a pipe-end cutting machine, which in turn is part of a sawing center or a pipe cutting machine. The drive 4, 5, 6 and/or the motor are NC controlled. The numerical control is not shown.

The one end in the lengthwise direction of the shaft 3 is in active connection with the motor 2, while another opposite end of the shaft 3 has a cutting tool 11 with three blades (not shown), which are intended to machine the end of a pipe segment. The pipe segment is not shown in FIG. 1. During the machining process, the lengthwise axis of the pipe segment is arranged in a holding device of a pipe cutting machine as a straight extension of the lengthwise axis of the shaft 3.

The shaft 3 passes through three push forks 12, 13, 14 and is mounted rotatably in each of them. The three push forks 12, 13, 14 are able to move back and forth in the lengthwise direction of the shaft 3 on it during the rotation of the shaft 3. Each of the three push forks 12, 13, 14 is connected to precisely one of the three threaded rods 7, 8, 9 free of translation in the lengthwise direction. Each of the three threaded rod drives 4, 5, 6 drives a back and forth motion of the respective threaded rod 7, 8, 9 in the lengthwise direction of the shaft 3. Each of the three threaded rod drives 7, 8, 9 can be controlled separately, for which purpose it has two connections 4*a*, 4*b*, 5*a*, 5*b*, 6*a*, 6*b*. The respective two connections 4*a*, 4*b*, 5*a*, 5*b*, 6*a*, 6*b* are provided for admitting and draining of hydraulic fluid to and from each of the three drives 4, 5, 6.

Figure 2:
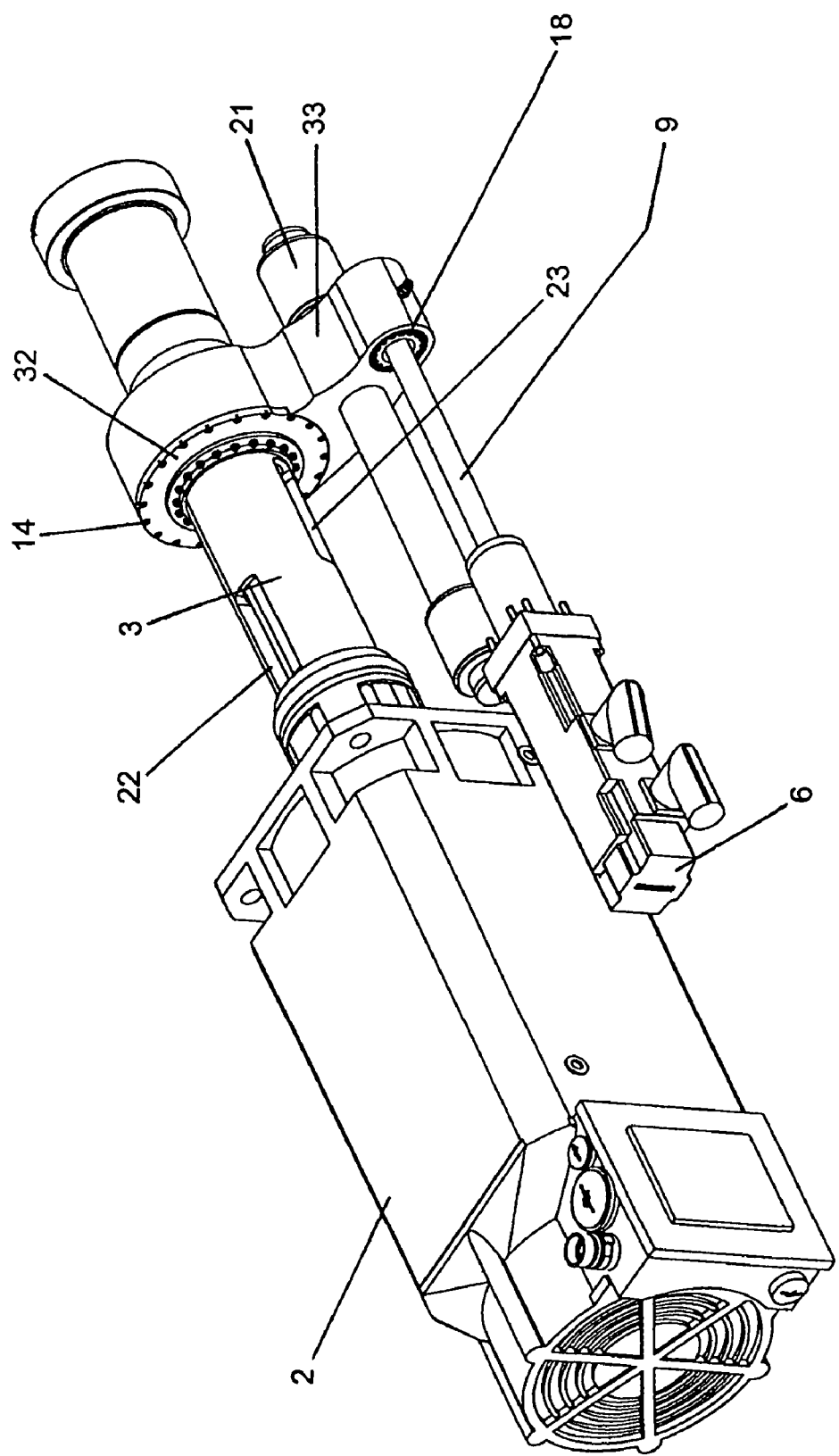

FIG. 2 shows a part of the rotary transmission leadthrough 1 with the third push fork 14 adjacent to the pipe being machined and being driven by the respective third drive 6 of the third threaded rod 9. The three push forks 12, 13, 14 are identical in construction. The third push fork 14 also has an annular segment 32 and a lug 35 standing off to the side from the annular segment 32. The annular segment 16 encloses the shaft 3, entirely free to rotate. The threaded rod 9 which is the closest of the three to the bottom is guided free of translation by a bearing 18 provided in the respective lug 35.

Each push fork 12, 13, 14 is stabilized by means of a guide 19, 20, 21. The lug of the third push fork 14 is mounted so that it can move back and forth along a third guide 21 in the lengthwise direction.

The shaft 3 can rotate in each annular segment and especially the third annular segment 32. Furthermore, the third push fork 14 is able to move back and forth on the shaft 3 along its lengthwise direction, the shaft 3 being able to rotate in the annular segment 32 in each of its translatory positions in the third push fork 14.

FIG. 2 shows two openings 22, 23 coordinated with each of the other push forks 12, 13. A third opening of identical construction is hidden by the third push fork 14. The first opening 22, facing the motor, is coordinated with the first push fork 12 and the second opening 23 with the second push fork 13. Three guides extend in the shaft 3 in the form of bores 26, 27, 28 produced in the lengthwise direction of the shaft 3, and in each of the bores 26, 27, 28 there is mounted one push rod 43, 44, 45, able to move back and forth relative to the shaft 3. The rotary transmission leadthrough 1 of the invention enables the transmission of a back and forth motion of the threaded rods 7, 8, 9 via the corresponding push forks 12, 13, 14 to a respective coordinated push rod 43, 44, 45 inside the rotating shaft 3. During the transmission process, the shaft 3 rotates with the three push rods 43, 44, 45, and the three push rods 43, 44, 45 are mounted free of rotation relative to the shaft 3.

Figure 3:
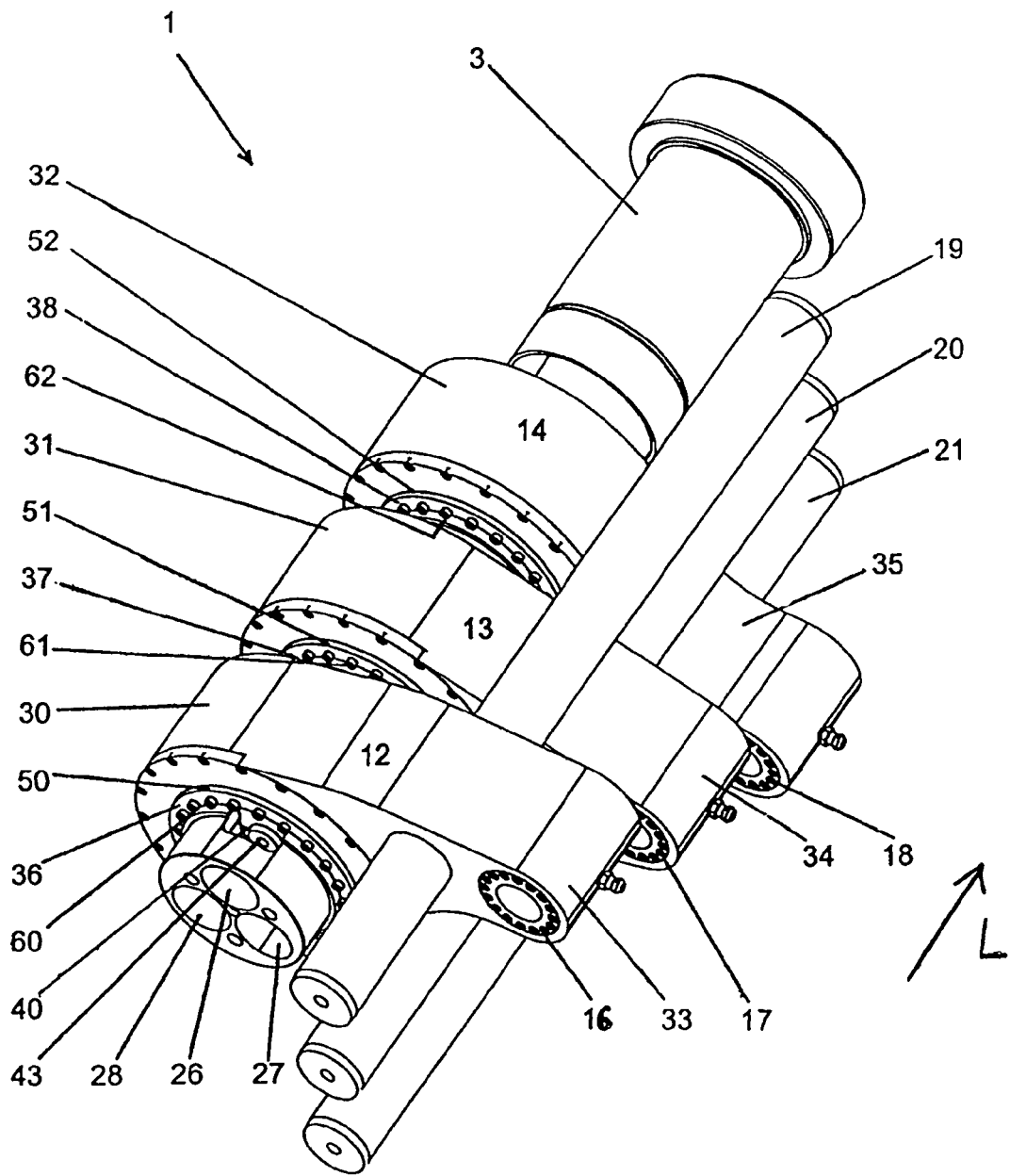

FIG. 3 shows the rotary transmission leadthrough per FIGS. 1 and 2 without the motor 2 and without the three threaded rod drives 4, 5, 6. The end of the shaft 3 facing the motor 2 can be seen in cross section. In the lengthwise direction of the shaft 3 run the three bores 26, 27, 28, which are formed circular along their entire length in a cross section perpendicular to the lengthwise direction. The three bores 26, 27, 28 are arranged in the shaft at a rotary angle of 120 degrees. Each bore 26, 27, 28 is coordinated with a side opening 22, 23 in the wall of the shaft, which opens the interior of the bore 26, 27, 28 to the outside. Through the openings, the translatory motion is transmitted into the interior of the shaft 3.

Concentrically between the interior annular wall of each annular segment 30, 31, 32 and the outer wall of the shaft 3 is provided an annular structural part 36, 37, 38 with an arm 40 reaching into the opening 22, 23. The annular structural part 36, 37, 38 is arranged so that it can move back and forth on the shaft 3 in the lengthwise direction. Each arm 40 has a holder for translation-free attachment of the respective push rod 43, 44, 45. Each annular structural part 36, 37, 38 is mounted on the shaft 3 by two ball bearings 50, 60, 51, 61, 52, 62. The annular structural part 36, 37, 38 is rotation-free relative to the shaft 3. Between the annular structural part 36, 37, 38 and the push fork 12, 13, 14 is provided an angular-contact ball bearing 50, 51, 52. The angular-contact ball bearing 50, 51, 52 enables a relative rotational movement between annular structural part 36, 37, 38 and push fork 12, 13, 14, while translatory motions of the push fork 12, 13, 14 can be transmitted to the annular structural part 36, 37, 38 via the angular-contact ball bearing 50, 51, 52.

The rotary transmission leadthrough 1 shown in FIG. 3 has three push rods 43, 44, 45, only one end face of the first push rod 43 being recognizable, whose end away from the motor 2 is in active connection with a cutting tool and controls this.

The lugs 33, 34, 35 of the push forks 12, 13, 14 are arranged at an angle offset to each other and a guide rod 19, 20, 21 is led through each of the lugs 33, 34, 35. The lug 33, 34, 35 of each push fork 12, 13, 14 can move back and forth in translation on the respective guide rod 19, 20, 21 in the lengthwise direction. The three guide rods 19, 20, 21 are fastened in firm position relative to the motor 2, for example, on the housing of the sawing machine.

Figure 4:
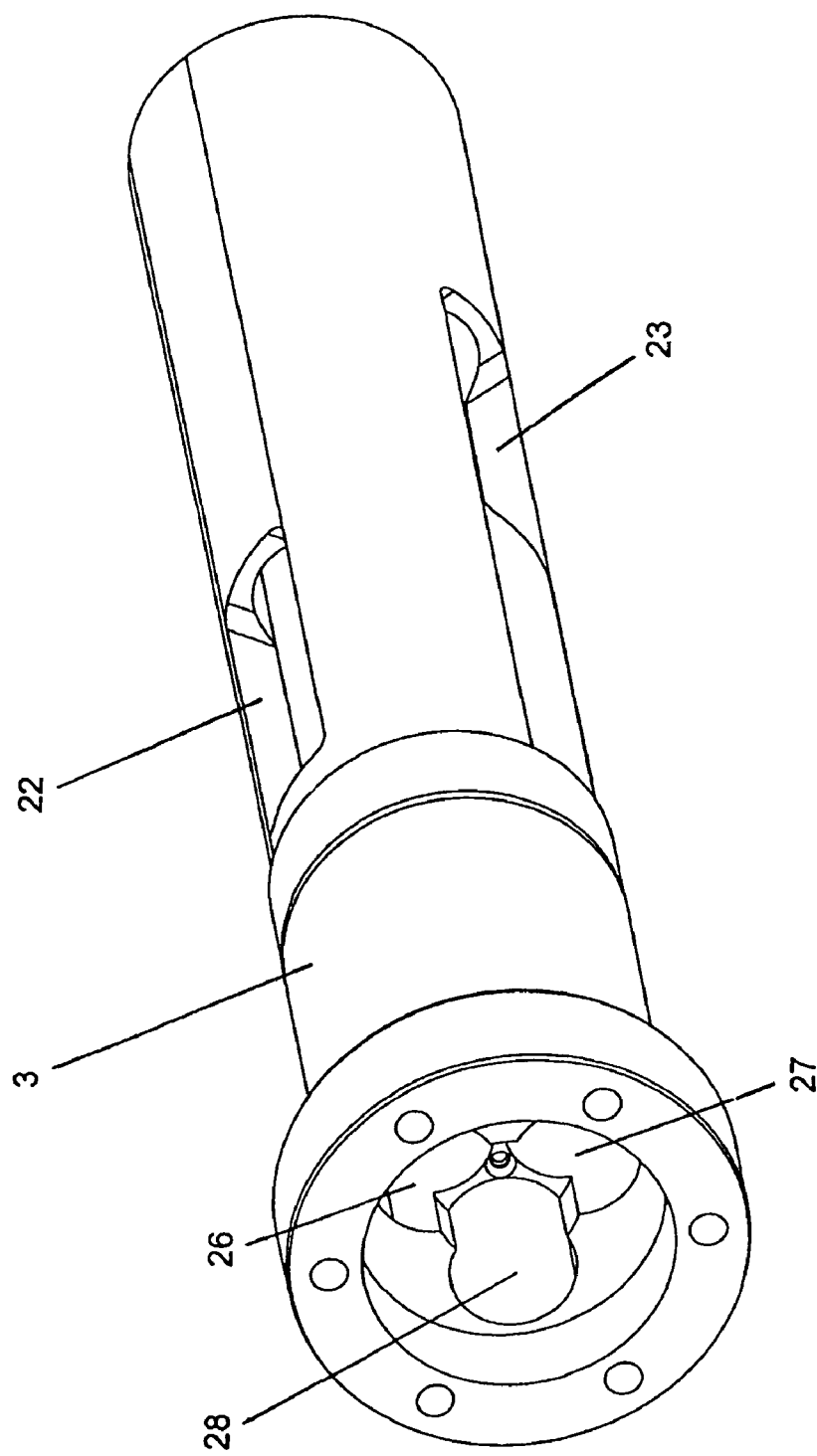

FIG. 4 shows the rotatable shaft 3. The front left shaft segment in FIG. 4 has the end of the rotatable shaft 3 facing the motor 2. The shaft 3 is connected to the motor 3 [sic?]free of twisting by a flange and can be driven directly by the motor 3[sic?]. In the shaft 3, the three bores 26, 27, 28 are led through the shaft 3 in the lengthwise direction of the shaft 3. The bores 26, 27, 28 have an opening at both ends of the shaft at the end face of the shaft. In the side wall of the shaft, each bore 26, 27, 28 is coordinated with an opening 22, 23. The openings 22, 23 are arranged with an offset relative to each in the lengthwise direction, by the extent of the opening 22, 23 in the lengthwise direction. The three openings 22, 23 are essentially identical in construction.

Figure 5:
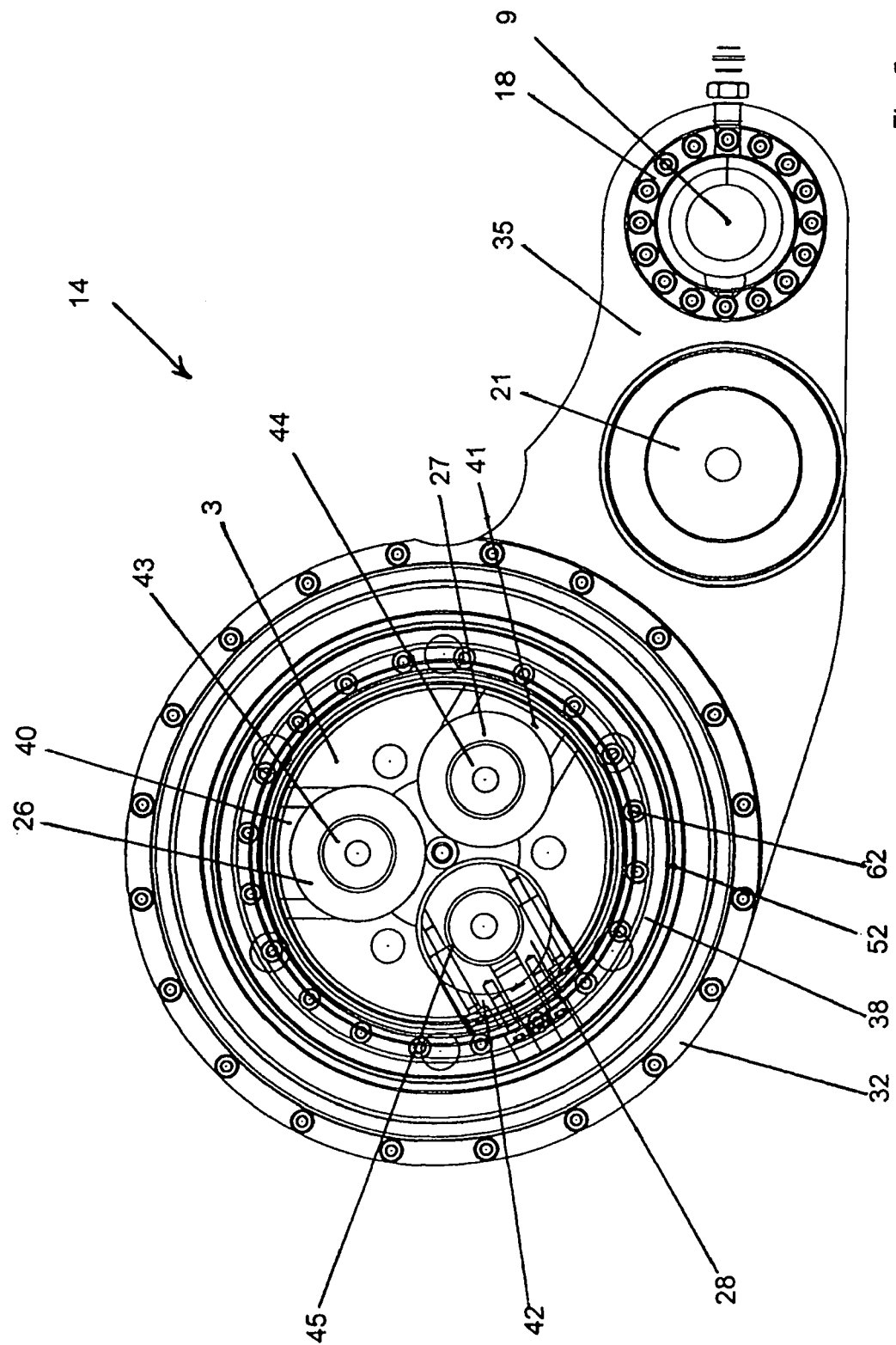

In FIG. 5, the third push fork 14 is shown in a section perpendicular to the lengthwise direction. The push fork 14 has the annular segment 32 and the lug 35. The lug 35 can move back and forth on the third guide rod 21, while the outermost end of the third lug 35 can be screwed to the third transmission rod 9 in a bearing 18, free of translation in the lengthwise direction.

FIG. 5 shows the shaft 3 with the three bores 26, 27, 28. Between the shaft 3 and the annular segment 32, the third annular structural part 38 is shown with a third arm 42 engaging in the third bore 28. The third annular structural part 38 can move in translation back and forth on the shaft 3 via an inner ball bearing 62. The annular structural part 38 turns with the shaft 3, it is free of rotation relative to it. Between the annular segment 32 and the annular structural part 38 is provided the third angular-contact ball bearing 52.

FIGS. 6-9 show four embodiments of a deflection mechanism, which converts the back and forth motion in the lengthwise direction of the shaft 3 of the three push rods 43, 44, 45 into a translatory motion in the radial direction of the shaft 3. Due to the radial mobility and controllability of the blades 70, one can produce relieving in the outer and inner wall of the pipe.

Figure 6:
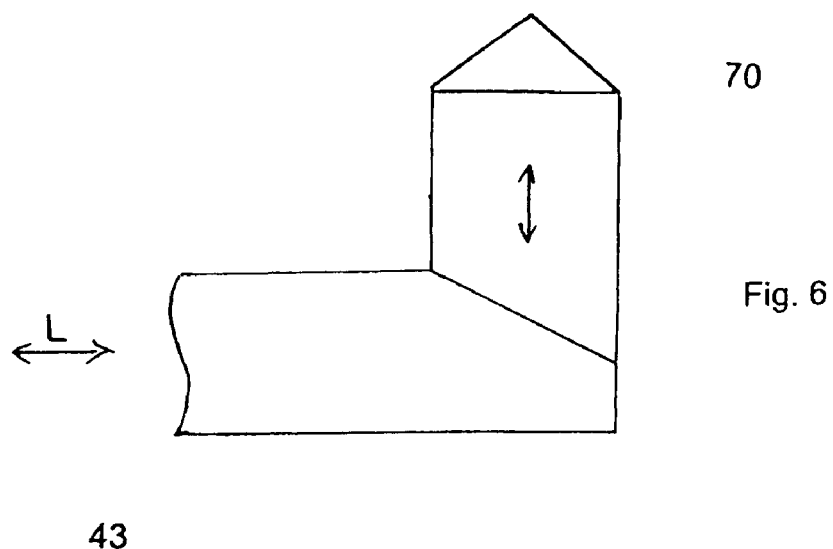

In FIG. 6, one outer end of the push rod 43 is beveled, and the bevel of the push rod 43 interacts with a bevel of a blade 70. The deflection mechanism is the same in configuration for all three cutting tools. Each blade 70, 71, 72 is spring-loaded.

Figure 7:
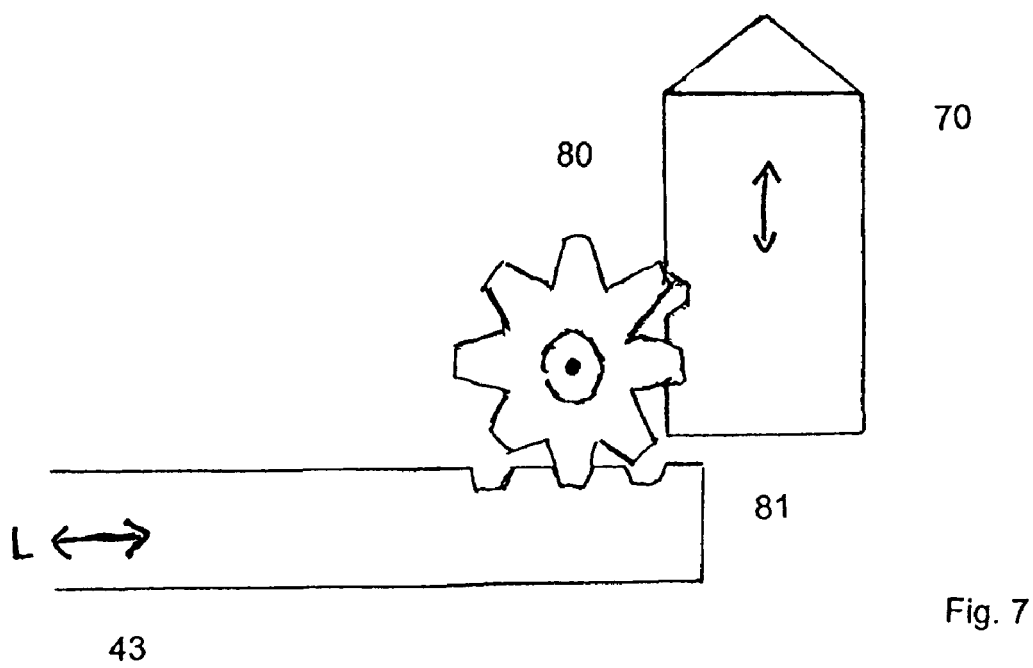

FIG. 7 shows a second deflection mechanism by means of a gear 80, which transmits the back and forth motion of the push rod 43 to a radial motion of the blade. For this, a tooth profile 81 is produced in the outer wall of the blade, as well as that of the push rod, and this interacts with teeth of the gear 80, able to turn in the plane subtended by the motion of the push rod and the blade.

Figure 8:
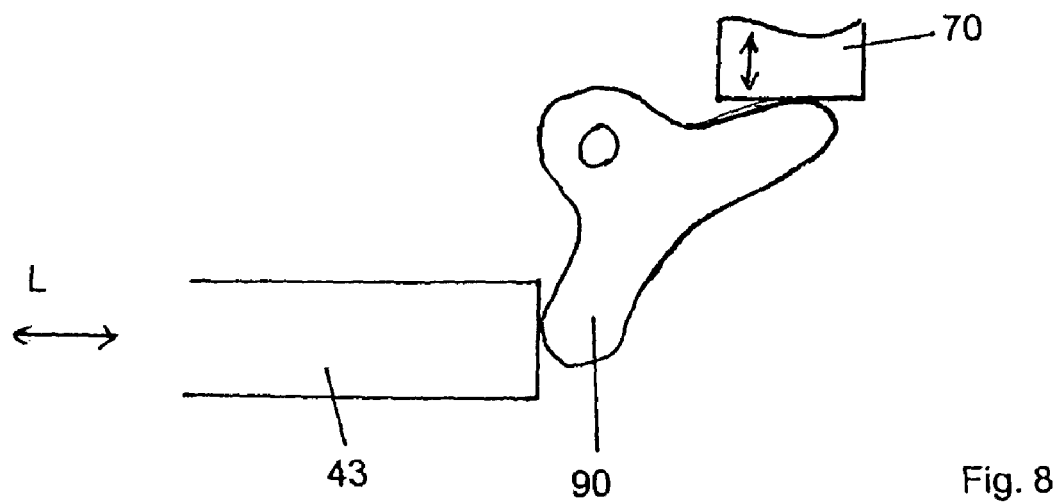

FIG. 8 shows a third deflection mechanism by means of a pivoting bone 90. The translatory motion of the push rod 43 is transmitted to a translatory but radial motion of the blade 70. The blade is spring loaded.

Figure 9:
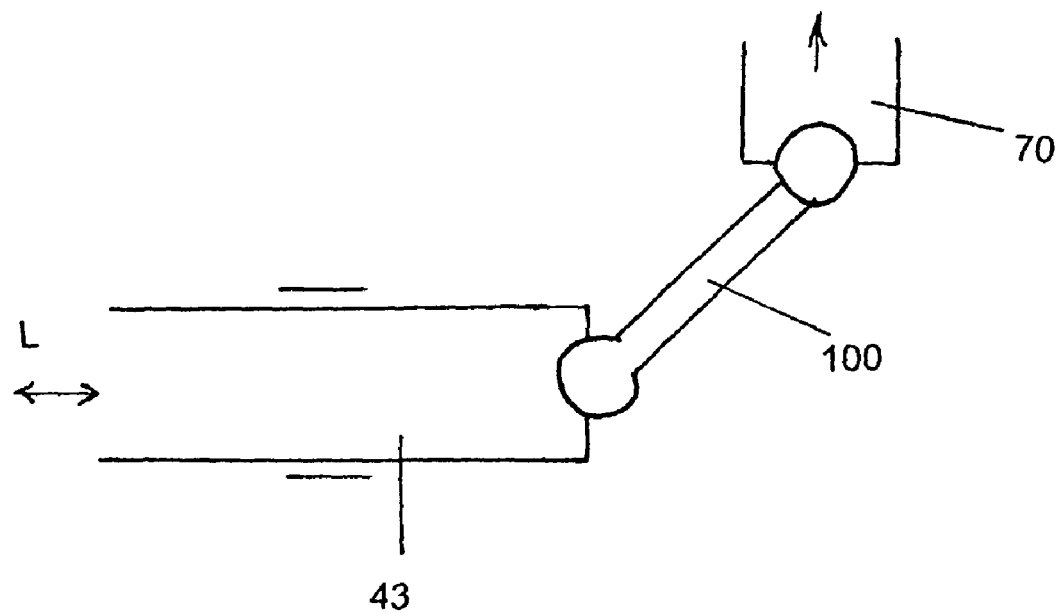

In FIG. 9, a fourth embodiment is provided in the form of a toggle link 100. The toggle link 100 has a ball at each of its two ends, which is let into a socket at the end face of the push rod 43 and the end face of the blade 70.

The pipe end being machined is arranged at the right in FIG. 6-9.

The invention claimed is:

1. Rotary transmission leadthrough with:
   a shaft (3) able to turn about a longitudinal axis running in the longitudinal direction (L) with at least one longitudinal borehole (26, 27, 28) running in the longitudinal direction (L);
   in which a push rod (43, 44, 45) is arranged and can move back and forth relative to the shaft (3) in the longitudinal direction (L); and
   with at least one opening (22, 23) in a lateral wall of the shaft which extends to a coordinated longitudinal borehole (26, 27, 28); and
   at least one push fork (12, 13, 14) which can travel in the longitudinal direction (L) outside the shaft (3) and is coordinated with one of the push rods (43, 44, 45); and
   an active connection running through the coordinated opening (22, 23) to the coordinated longitudinal borehole (26, 27, 28) between the coordinated push fork (12, 13, 14) and the coordinated push rod (43, 44, 45), which transmits a back and forth motion of the coordinated push fork (12, 13, 14) relative to the shaft (3) onto the coordinated push rod (43, 44, 45), and enables a rotary motion of the shaft (3) relative to the coordinated push fork (12, 13, 14).

2. Rotary transmission leadthrough per claim 1, characterized in that the active connection has an arm (40) reaching through the coordinated opening (22, 23), which is joined to the respective push rod (43, 44, 45) free of translation, and the opening (22, 23) is longer in the longitudinal direction (L) than the dimension of the arm (40) in the opening (22, 23), and the arm (40) in the opening (22, 23) can move back and forth in the longitudinal direction (L).

3. Rotary transmission leadthrough per claim 2, characterized in that the arm (40) is connected to the coordinated push fork (12, 13, 14) free of translation.

4. Rotary transmission leadthrough per claim 1, characterized by at least one annular structural part (36, 37, 38) that surrounds the shaft (3) in the segment of an opening (22, 23), from which one of the arms (40) sticks out into an opening (40).

5. Rotary transmission leadthrough per claim 4, characterized in that the annular structural part (36, 37, 38) is arranged on the shaft (3) able to shift back and forth in the lengthwise direction (L).

6. Rotary transmission leadthrough per claim 5, characterized by an inner ball bearing (50, 51, 52) between the annular structural part (36, 37, 38) and the shaft (3), enabling a back and forth movement of the annular structural part (36, 37, 38) on the shaft (3).

7. Rotary transmission leadthrough per claim 1, characterized in that the push fork (12, 13, 14) has an annular segment (30, 31, 32) that concentrically encloses the shaft (3), being connected via an outer bearing (60, 61, 62) to an annular structural part (36, 37, 38), able to rotate relative to the annular segment (30, 31, 32) and being arranged concentrically inside the annular segment (30, 31, 32).

8. Rotary transmission leadthrough per claim 7, characterized in that the outer bearing is an angular-contact ball bearing (60, 61, 62).

9. Rotary transmission leadthrough per claim 7, characterized in that on each annular segment (30, 31, 32) there is provided a lug (33, 34, 35), each of which engages with a drive mechanism (4, 5, 6, 7, 8, 9) and moves the push fork (12, 13, 14) back and forth.

10. Rotary transmission leadthrough per claim 9, characterized in that the drive mechanism has a threaded rod (7, 8, 9) connected to the lug (33, 34, 35) free of translation.

11. Rotary transmission leadthrough per claim 10, characterized in that each of the push forks (12, 13, 14) is guided along a guide rod (19, 20, 21) running in the lengthwise direction (L) along the shaft (3).

12. Rotary transmission leadthrough per claim 1, characterized in that at least one lengthwise bore (26, 27, 28) is arranged eccentrically to the axis of rotation of the shaft (3).

13. Rotary transmission leadthrough per claim 9, characterized by a plurality of lengthwise bores (26, 27, 28) provided alongside each other in the shaft (3) and a plurality of openings (22, 23) coordinated with the lengthwise bores (26, 27, 28), being arranged one behind the other in the lengthwise direction (L) and staggered by at least their respective lengthwise dimension.

14. Rotary transmission leadthrough per claim 10, characterized by a plurality of push forks (12, 13, 14) staggered in the lengthwise direction (L) and arranged one behind the other on the shaft (3), each in the segment of an opening (22, 23).

15. Machine per claim 1 for the machining of ends of a rodlike profile material, especially metal pipes, with a holding device for the profile material and with the rotary transmission leadthrough (1), and with at least one blade (70, 71, 72) in active connection with the push rod (43, 44, 45), which is provided at one end of the shaft (3) facing the holding device for machining the end of the rodlike profile material.

16. Machine per claim 15, characterized by an electronic control system, which is connected by control lines to the drives (4, 5, 6) of the threaded rods (7, 8, 9) and the motor of the shaft (3).

17. Machine per claim 15, characterized in that a deflection mechanism is provided between the push rod (43, 44, 45) and the blade (70, 71, 72).

18. Machine per claim 17, characterized in that one end of the push rod (43, 44, 45) facing the holding device is beveled and the blade (70, 71, 72) able to move back and forth across the push rod (43, 44, 45) is spring-loaded and has a correspondingly beveled end and the two beveled ends interact with each other.

19. Method with a rotary transmission leadthrough according to claim 1, characterized, in that:
   a shaft with at least one lengthwise bore (26, 27, 28) running in the lengthwise direction (L) is turned about a lengthwise axis running in the lengthwise direction (L), a back and forth motion of at least one push fork (12, 13, 14), coordinated with one of the push rods (43, 44, 45) and able to travel in the lengthwise direction (L) outside of the shaft (3), is led through at least one side opening (22, 23) in a shaft wall, coordinated with a lengthwise bore (26, 27, 28), and a push rod (43, 44, 45) arranged in the lengthwise bore (26, 27, 28) is pushed back and forth.

20. Method for machining of ends of a rodlike profile material, especially metal pipes, with a machine according to claim 16, characterized, in that:
   the profile material is fixed in the holding device,
   a desired bevel profile is entered into the control system, and
   and the motor (2) and the drives (4, 5, 6) are actuated to generate the desired bevel profile at the pipe end.

* * * * *